United States Patent Office 3,245,956
Patented Apr. 12, 1966

3,245,956
POLYURETHANES CHAIN-EXTENDED WITH HEXAHYDROXYLYLENE GLYCOL
Erwin Muller, Leverkusen, Konrad Ellegast, Leichlingen, and Hugo Wilms, Leverkusen, Germany, assignors to Farbenfabriken Bayer Aktiengesellschaft, Leverkusen, Germany, a German corporation
No Drawing. Filed June 25, 1962, Ser. No. 205,125
Claims priority, application Germany, July 26, 1961, F 34,532
11 Claims. (Cl. 260—75)

This invention relates to elastomeric porous polyurethane plastics and to a method of preparing the same. More particularly it relates to elastomeric polyurethane plastics prepared from an organic compound containing active hydrogen atoms, a chain extending agent, and organic polyisocyanates.

It has been heretofore known to produce elastomeric polyurethane plastics by reacting an organic compound containing active hydrogen atoms which are reactive with —NCO groups and having a molecular weight of greater than 1000 with organic polyisocyanates and chain extending agents such as glycols, diamines, amino alcohols and the like, thus producing a high molecular weight cross-linked synthetic plastic.

By a suitable choice of the reactive compounds, and the portion of the components used, products varying from an elastic rubber-like consistency to that of leather may be obtained. Generally, di- and trihydric alcohols are utilized as the chain extending agent containing two or more active hydrogen atoms. These chain extending agents generally have a molecular weight of below about 1000. The choice and quantity of the particular organic polyisocyanate and polyhydric alcohol used as the chain extending agent primarily influences the properties of the resulting plastics. For example, when final products having high hardness and elasticity are desired it is necessary to increase the quantity of the organic polyisocyanate and the chain extender used with respect to the quantity of the organic compound containing active hydrogen atoms, for example, the hydroxyl polyesters. However, when this is done utilizing glycols containing primary hydroxyl groups, the reaction rate of the isocyanate with the primary hydroxyl groups proceeds so fast that the casting time, which is defined as the period of time between mixing and pouring into a mold, is greatly reduced and in many cases becomes impractical from a handling standpoint. For this reason, when plastics having high hardness and elasticity are desired, it becomes necessary to use as the chain extenders glycols having secondary hydroxyl groups. These glycols react less rapidly with isocyanate groups, thus giving a longer casting time. However, in most instances the longer casting time is accomplished by a higher permanent deformation than that observed when using primary hydroxyl containing glycols.

It is, therefore, an object of this invention to provide improved elastomeric non-porous polyurethane plastics. It is another object of this invention to provide elastomeric non-porous polyurethane plastics having a high hardness and elasticity. It is another object of this invention to provide elastomeric polyurethane plastics which exhibit an extremely small amount of permanent deformation. It is still another object of this invention to provide an improved method of making elastomeric polyurethane plastics. It is a further object of this invention to provide an improved method of making elastomeric polyurethane plastics utilizing a glycol having primary hydroxyl groups wherein the casting time of the reaction mixture is equivalent to a system wherein a glycol having secondary hydroxyl groups is used.

The foregoing objects and others which will become apparent from the following description are accomplished in accordance with this invention, generally speaking, by providing non-porous elastomeric polyurethane plastics by reacting an organic compound having a molecular weight of at least about 1000 and containing active hydrogen atoms which are reactive with —NCO groups with an organic polyisocyanate and hexahydroxylylene glycol. Thus the invention contemplates the preparation of elastomeric polyurethane plastics of great hardness, high elasticity, and an extremely small permanent deformation by utilizing as the chain extending agent in a reactive system including an organic compound containing active hydrogen atoms and an organic polyisocyanate, hexahydroxylylene glycol. Utilizing these chain extending agents, a casting time equivalent to that of a system using a glycol having secondary hydroxyl groups is obtained without a corresponding decrease in permanent deformation.

The purpose of this invention is applicable to the preparation of elastomeric products by the various methods known to those in the art. Thus the organic compound containing active hydrogen atoms and having a molecular weight greater than 1000, the polyisocyanate and the hexahydroxylylene glycol can be mixed together in the proper proportions and cast in the usual casting technique into a mold having the desired final configuration. Of course, this same technique can be accomplished by first reacting the polyisocyanate and the compound containing active hydrogen atoms to obtain an —NCO terminated prepolymer and then mixing this prepolymer with the hexahydroxylylene glycol in the casting technique. The process is also useful in the millable gum technique where in the organic compound containing active hyrdogen atoms, the hexahydroxylylene glycol and a deficiency of the polyisocyanate are first reacted to form a millable gum and then this millable gum is further mixed with an additional quantity of an organic polyisocyanate such as dimeric toluylene diisocyanate on a roll mill such as that used in the rubber industry, and the final product formed by a compression molding technique or the like. In this millable gum technique, a suitable peroxide such as, for example, dicumyl peroxide may be incorporated into the millable gum to bring about the cross-linking.

In addition, the process of this invention is useful in what has been termed the thermoplastic technique wherein the reaction compounds are mixed and caused to partially react. The reaction is then interrupted while the material can still be worked by thermoplastic techniques. At this point the material is generally in the solid state. This solid partially reacted material can be fabricated into the desired final form by molding techniques such as, for example, compression molding, injection molding, extrusion, and the like. In this technique, as well as in the casting and millable gum procedures, a one-shot mixing system or a prepolymer procedure can be followed.

Any suitable organic compound having a molecular weight of at least about 1000 and containing active hydrogen atoms which are reactive with —NCO groups may be used in the fabrication of suitable polyurethane plastics such as, for example, hydroxyl polyesters, polyester amides, polyhydric polyalkylene ethers, polyhydric polythioethers, polyacetals and the like. Any suitable hydroxyl polyester may be used such as, for example, the reaction product of a polycarboxylic acid and a polyhydric alcohol. Any suitable polycarboxylic acid may be used in the preparation of the polyesters such as, for example, adipic acid, succinic acid, suberic acid, sebacic acid, oxalic acid, methyl adipic acid, glutaric acid, pimelic acid, azelaic acid, phthalic acid, terephthalic acid, isophthalic acid, thiodiglycollic acid, thiodipropionic acid, maleic acid, fumaric acid, citraconic acid, itaconic acid, benzene tricarboxylic acid and the like. Of course, the corresponding acid anhydrides may also be used. Any suitable polyhydric alcohol may be used in the preparation of the polyesters such as, for example, ethylene glycol, propylene glycol, butylene glycol, hexanediol, bis-(hydroxy-methyl cyclohexane), 1,4-butanediol, diethylene glycol, polyethylene glycol, 2,2-dimethyl propylene glycol, xylylene glycol, trimethylol ethane, trimethylol propane, glycerine, pentaerythritol, sorbitol, and the like. It is generally preferred that the polyurethane elastomeric plastics have a substantially linear configuration and, therefore, the difunctional acids and alcohols are preferred.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, condensates of ethylene oxide, propylene oxide, butylene oxide, amylene axide, styrene oxide, and mixtures thereof. The polyalkylene ethers prepared from tetrahydrofuran may also be used. The polyhydric polyalkylene ethers may be prepared by any known process such as, for example, the process described by Wurtz in 1859 and in the "Encyclopedia of Chemical Technology"; volume 7, pages 257 to 262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulphide, 4,4'-dihydroxy butyl sulphide, 1,4-($\beta$-hydroxy ethyl) phenylene dithioether and the like.

Any suitable polyester amide may be used such as, for example, the reaction product of an amine and/or amino alcohol with a carboxylic acid. Any suitable amine such as, for example, ethylene diamine, propylene diamine, and the like may be used. Any suitable amino alcohol such as, for example, $\beta$-hydroxy ethyl amine and the like may be used. Any suitable polycarboxylic acid may be used such as, for example, those more particularly described above for the preparation of the hydroxyl polyesters. Further, a mixture of a glycol and an amino alcohol or polyamine may be used. Any of the glycols mentioned for the preparation of the polyesters may be used.

Any suitable polyacetal may be used such as, for example, the reaction product of an aldehyde and a polyhydric alcohol. Any suitable aldehyde may be used such as, for example, formaldehyde, paraldehyde, butylaldehyde and the like. Any of the polyhydric alcohols mentioned above in the preparation of the hydroxyl polyesters may be used. Any of the polyacetals set forth in U.S. Patent 2,961,428 may be used.

The functional groups of the compound having a molecular weight of at least 1000 should preferably be from 0.6 to about 2.4% of the molecular weight.

Any suitable organic polyisocyanate may be used in the process of this invention such as, for example, aliphatic, aromatic, alicyclic, and heterocyclic polyisocyanates including such as, for example, ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 4,4'-diphenyl methane diisocyanate, 2,2'-diphenyl propane-4,4'-diisocyanate, 3,3'-dimethyl diphenyl methane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenyl sulphone - 4,4' - diisocyanate dichlorohexamethylene diisocyanate, tetramethylene diisocyanate, pentamethylene diisocyanate, hexamethylene diisocyanate, 1-chlorobenzene-2,4 - diisocyanate, furfurylidene diisocyanate, 2,7 - diisocyanato-dibenzofuran, 1,3,5-benzene-triisocyanate, 2,4,6-tolylene triisocyanate, triphenyl methane triisocyanate, tetraphenylmethane tetraisocyanate, polymerized isocyanates such as those containing isocyanurate rings, uretdiones and the like.

It is preferred, however, that diisocyanates and particularly aromatic diisocyanates be used. Best results are obtained using 4,4'-diphenyl methane diisocyanate and tolylene diisocyanates.

Hexahydro-p-xylylene glycol and/or hexahydro-m-xylylene glycol may be used either alone or as a mixture, the cis-transisomeric mixture normally being used. Further, mixtures of the hexa-hydro-xylylene glycol with other glycols or trihydric alcohols may be used. Any of the glycols set forth above with regard to the preparation of the polyester may be used along with the hexahydroxylylene glycol.

The invention is further illustarted by the following examples in which parts are by weight unless otherwise specified.

EXAMPLES 1–4

The formulations for Examples 1 to 4 are set forth in Table I. The naphthylene-1,5-diisocyanate is added to a dehydrated polyester prepared by reacting 11 mols of ethylene glycols and 10 mols adipic acid to an hydroxyl number of 56 and an acid number of 1. This mixture is stirred for about 30 minutes at about 130° C. The hexahydro-p-xylylene glycol which consists of a mixture of 70 parts of trans- and 30 parts of cis-isomers is then added with stirring and the melt is poured into the prepared mold. The molded articles are then heated for about 24 hours.

Table I

| Examples | 1 | 2 | 3 | 4 |
|---|---|---|---|---|
| Polyester | 100 | 100 | 100 | 100 |
| Naphthylene-1,5-diisocyanate | 18 | 18 | 30 | 50 |
| Hexahydro-p-xylylene glycol | 3.2 | 3.2 | 11.2 | 19 |
| Trimethylolpropane | | 0.02 | | 3 |
| Pouring time in minutes | 7 | 5 | 2½ | 1½ |
| Time for removal from the mold | 120 | 25 | 10 | 5 |
| Shore hardness, A/D DIN 53505 | 60 | 70 | 91/36 | 96/51 |
| Tensile strength, kg./cm.², DIN 53504 | 300 | 350 | 270 | 320 |
| Elongation at break, percent, DIN 53504 | 760 | 530 | 500 | 325 |
| Permanent elongation, percent, DIN 53504 | | 2 | 16 | 25 |
| Load at 20% elongation, DIN 53504 | 10 | 14 | 40 | 110 |
| Load at 300% elongation, DIN 53504 | 50 | 78 | 163 | 293 |
| Structural stability (Graves), kg./cm., DIN 53515 | 48 | 22 | 70 | 67 |
| Needle tear strength, kg./cm., DIN 53506 | 63 | 56 | 83 | 93 |
| Elasticity, percent, DIN 53512 | 44 | 42 | 41 | 28 |
| Abrasion loss, DIN 53516 | 51 | 46 | 55 | 110 |

It is, of course, to be understood that any of the organic compounds containing active hydrogen atoms and a molecular weight of at least 1000, the organic polyisocyanate and any isomeric mixtures of hexahydro-p-xylylene glycol or hexahydro-m-xylylene glycol may be used in the working examples for the specific compositions utilized therein. Further the hexahydroxylylene glycol may be mixed with other glycols and triols.

The polyurethane plastics obtained by the process of the present invention are useful in a variety of commercial applications, such as, for example, the preparation of various molded articles and more particularly tires, shoe heels, toys and the like.

Although the invention has been described in considerable detail for the purpose of illustration, it is to be understood that variations can be made by those skilled in the art without departing from the spirit of the invention and scope of the claims.

What is claimed is:

1. A method for preparing elastomeric non-porous polyurethane plastics which comprises reacting an organic polyisocyanate with an organic compound having a molecular weight of at least about 1000 and containing active hydrogen atoms which are reactive with —NCO groups and hexahydroxylylene glycol.

2. A method for preparing elastomeric non-porous polyurethane plastics which comprises reacting an organic polyisocyanate with an organic compound having a molecular weight of at least about 1000 and containing active hydrogen atoms which are reactive with —NCO groups and hexahydro-p-xylylene glycol.

3. A method for preparing elastomeric non-porous polyurethane plastics which comprises reacting an organic polyisocyanate with an organic compound having a molecular weight of at least about 1000 and containing active hydrogen atoms which are reactive with —NCO groups and hexahydro-m-xylylene glycol.

4. The process of claim 1 wherein the organic compound containing active hydrogen atoms is an hydroxyl polyester.

5. The process of claim 1 wherein the organic compound containing active hydrogen atoms is a polyhydric polyalkylene ether.

6. The process of claim 1 wherein the organic polyisocyanate is an aromatic diisocyanate.

7. The process of claim 1 wherein the organic polyisocyanate is 4,4'-diphenylmethane diisocyanate.

8. The process of claim 1 wherein the organic polyisocyanate is toluylene diisocyanate.

9. A method for preparing elastomeric non-porous polyurethane plastics which comprises reacting an organic polyisocyanate with an organic compound having a molecular weight of at least about 1000 and containing active hydrogen atoms which are reactive with —NCO groups and selected from the group consisting of hydroxyl polyesters prepared by reacting polyhydric alcohols with polycarboxylic acids, polyhydric polyalkylene ethers, polyhydric polythioethers, and polyacetals and hexahydroxylylene glycol.

10. A method for preparing elastomeric non-porous polyurethane plastics which comprises reacting an organic polyisocyanate with an organic compound having a molecular weight of at least about 1000 and containing active hydrogen atoms which are reactive with NCO groups in a first step to prepare an NCO terminated prepolymer and reacting said NCO terminated prepolymer with hexahydroxylylene glycol.

11. A method for preparing elastomeric non-porous polyurethane plastics which comprises reacting an organic polyisocyanate with an organic compound having a molecular weight of at least about 1000 and containing active hydrogen atoms which are reactive with —NCO groups and a compound selected from the group consisting of hexahydro-p-xylylene glycol and hexahydro-m-xylylene glycol.

References Cited by the Examiner

UNITED STATES PATENTS

| | | | |
|---|---|---|---|
| 2,729,618 | 1/1956 | Muller et al. | 260—75 |
| 2,916,472 | 12/1959 | Nischk et al. | 260—75 |
| 2,952,666 | 9/1960 | Coover et al. | 260—77.5 |
| 2,956,961 | 10/1960 | Kibler et al. | 260—75 |

OTHER REFERENCES

Lyman, J. Poly. Sci., vol. 55, pp. 507–514 (1961).

DONALD E. CZAJA, *Primary Examiner.*

JOSEPH R. LIBERMAN, LEON J. BERCOVITZ,
*Examiners.*